United States Patent [19]

Takei et al.

[11] Patent Number: 4,899,525
[45] Date of Patent: Feb. 13, 1990

[54] CLIPPING COLLECTOR EQUIPPED WITH FRONT MOWER

[75] Inventors: Terutaka Takei; Shigeru Morita; Hiroaki Kawakita, all of Osaka, Japan

[73] Assignee: Kubota, Ltd., Osaka, Japan

[21] Appl. No.: 178,974

[22] Filed: Apr. 7, 1988

[30] Foreign Application Priority Data

Apr. 9, 1987 [JP] Japan .................................. 62-87680
Apr. 9, 1987 [JP] Japan .................................. 62-87682

[51] Int. Cl.⁴ ............................................. A01D 34/70
[52] U.S. Cl. ..................................... 56/202; 56/16.6; 180/53.7; 180/337; 475/198
[58] Field of Search ................... 56/6, 7, 16.4, 16.6, 56/202; 180/53.7, 71, 72, 73.1, 75; 74/665 GE, 665 L, 700, 713

[56] References Cited

U.S. PATENT DOCUMENTS

| 4,345,416 | 8/1982 | Cameron | 56/202 X |
| 4,429,515 | 2/1984 | Davis, Jr. et al. | 56/6 |
| 4,589,249 | 5/1986 | Walker et al. | 56/202 X |
| 4,738,327 | 4/1988 | Takei | 56/6 X |
| 4,777,786 | 10/1988 | Arnold | 56/202 X |

FOREIGN PATENT DOCUMENTS

62-31530  2/1987  Japan.

Primary Examiner—Jerome W. Massie
Assistant Examiner—David J. Bagnell
Attorney, Agent, or Firm—Birch, Stewart, Kolasch & Birch

[57] ABSTRACT

A frame has mounted thereon an engine and a speed change unit arranged adjacent to each other widewise of the frame to provide a vehicle body. The vehicle body has a front axle supporting a pair of front wheels thereon, a rear axle supporting at least one steering rear wheel, a mount assembly at its front portion for attaching thereto a mower having at least one cutter, and a clipping container mounted on its rear portion. From a clipping outlet formed in the rear portion of the mower, a duct extends rearward generally horizontally under the front axle, is bent upward behind one of the front wheels and is connected to the clipping container.

11 Claims, 6 Drawing Sheets

CLIPPING COLLECTOR EQUIPPED WITH FRONT MOWER

FIELD OF THE INVENTION AND RELATED ART STATEMENT

The present invention relates to a clipping collector comprising a vehicle body adapted to travel on the ground, a mower attached to the front portion of the vehicle body for cutting grass or the like with a cutter, and a clipping container mounted on the rear portion of the vehicle body for collecting the clippings through a duct.

The machines designed specifically for use in mowing grass or the like include those of the front mower type comprising a mower at the front portion of the machine, and those of the mid-mount mower type including a mower under the bottom of the machine. The machine of the front mower type is adapted for mowing immediately under shrubs, permits the operator to observe the work site and is known to be superior in work efficiency.

Such conventional machines are disclosed in Japanese Utility Model Application SHO 60-124437 and U.S. Pat. No. 4,429,515.

The machine of the application comprises an engine and a speed change unit which are arranged longitudinally of the machine to form a vehicle body, a mower attached to the front portion of the vehicle body by a mount assembly, a clipping container disposed above the engine at the rear portion of the body, and a duct provided on one outer side of the vehicle body for connecting a clipping outlet formed at one lateral side of the mower to the clipping container.

With this machine, the duct can be disposed in a desired posture without interference with the vehicle body but gives the mower an increased overall width larger than the cutting width since the duct is projected from one side of the mower, presenting difficulty in mowing in a narrow place. Further if the operator's seat is provided at the lengthwise midportion of the vehicle body, the operator is unable to ride the machine easily due to the presence of the duct. Moreover, the engine and the speed change unit, which are arranged in series, add to the overall length of the vehicle body, render the machine unable to make a small turn and impose a limitation on the capacity of the clipping container.

According to the latter disclosure, a clipping outlet is formed in the rear top portion of the front mower in the widthwise middle thereof, and the outlet is connected by a duct to an inlet formed in the upper side of a clipping container disposed above rear wheels. The duct extends through the vehicle body between an engine and an operator's seat. The engine drives the mower through a belt, which also serves to drive a hydraulic motor for front wheels.

With the latter machine, the clippings must be ejected upward at a large angle from the mower into the duct extending upward from the outlet, therefore will not flow smoothly and are likely to clog up the duct. The duct is difficult to install. The transmission means for the duct and the mower becomes an obstacle, making it difficult to incorporate a speed change unit, front wheel differential gear, etc. into the front wheel drive system in the vehicle body and permitting use of the hydraulic motor only.

OBJECTS AND SUMMARY OF THE INVENTION

An important object of the present invention is to provide a machine of the type described above wherein the duct extends from a clipping outlet in the rear portion of the mower generally horizontally rearward under the front axle so as to smoothly eject the clippings from the mower into the duct without resistance while decreasing the mower in its overall width to render the machine usable even in narrow places.

Another important object of the invention is to provide a machine of the type described wherein the duct extending under the front axle is bent upward in the rear of one front wheel, and a storage container is provided behind the upwardly bent duct portion to protect the duct from obstacles when the machine is advanced rearward.

Another important object of the invention is to dispose a front wheel differential gear as spaced sidewise from the duct to thereby position the duct at a high level close to the front axle without the interference of the differential gear.

Another important object of the invention is to form a box structure at a lengthwise intermediate portion of a vehicle body frame and to arrange an engine and a speed change unit side by side within the box structure so as to reduce the overall length of the vehicle body and to enable the machine to make a small turn.

Another important object of the invention is to provide a rear wheel suspension assembly extending rearward from a vertically intermediate rear portion of the box structure, with at least one steering rear wheel supported by the suspension assembly, and to mount a clipping container on the suspension assembly so as to enable the container to have an increased capacity and render the rear wheel turnable smoothly in contact with the ground under an increased load.

BRIEF DESCRIPTION OF THE DRAWINGS

FIGS. 1 to 7 a clipping collector equipped with a front mower and embodying the invention;

DESCRIPTION OF THE PREFERRED EMBODIMENTS

Embodiments of the invention will be described below with reference to the accompanying drawings.

Referring to FIGS. 1 to 7, a clipping collector 1 is equipped with a front mower 2. The collector 1 includes a frame 3 having mounted thereon an engine 4, speed change unit 5, etc. to provide a vehicle body 6 of frame structure. A pair of opposed front wheels 8 are supported by front axles 7 at the front portion of the vehicle body. A pair of opposed rear wheels 10 are supported by rear axles 9 at the rear portion of the body 6. A clipping container 11 is disposed above the rear wheels 10. An operator's seat 94 is disposed above the body approximately at the center thereof, as positioned closer to the front wheels. A steering assembly 12 is provided at the front end of the frame 3.

Figures 4, 8:
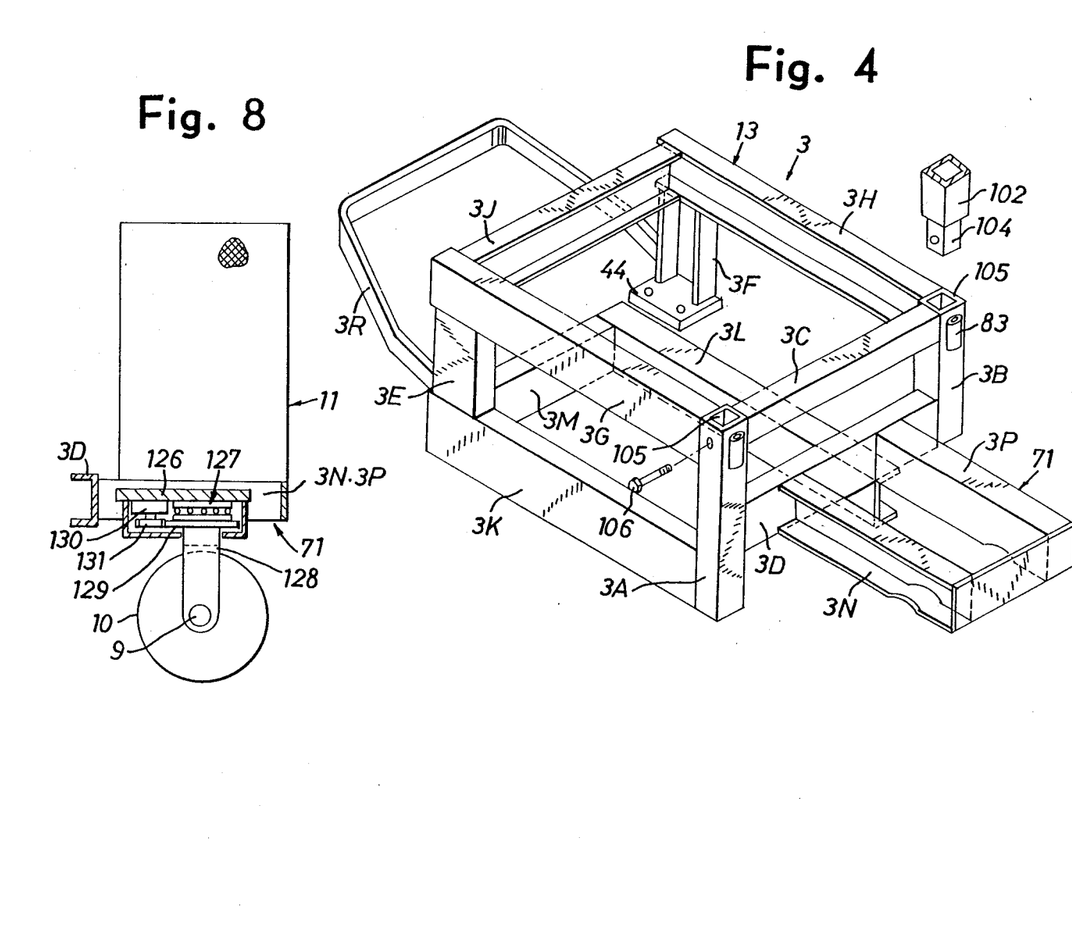
FIG. 4 is a perspective view of a vehicle body frame.
FIG. 8 is a side elevation in section showing a rear wheel of the caster type.
Figure 5:
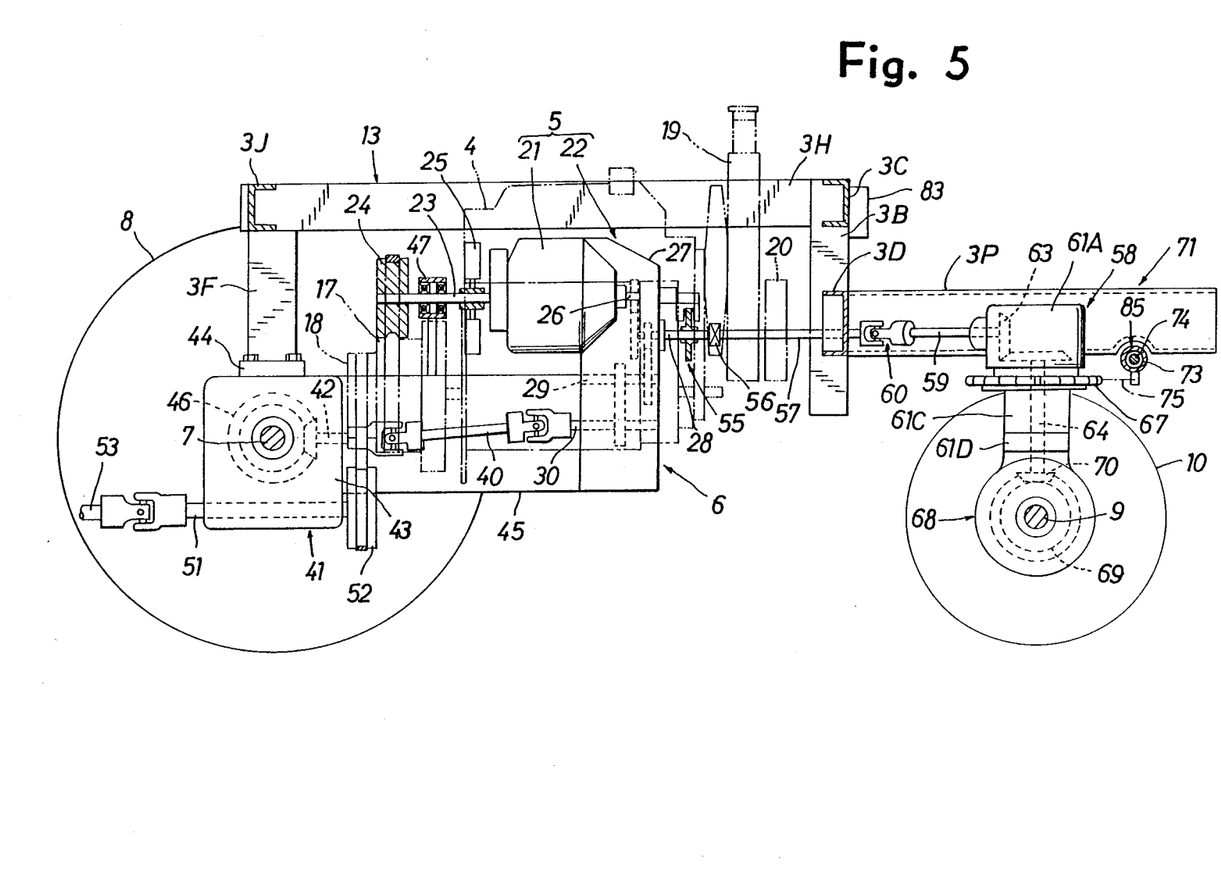
FIG. 5 is a side elevation in section showing a drive system.

With reference to FIG. 4, the frame 3 comprises two rear posts 3A, 3B each in the form of a pipe of square cross section, rear lateral channel members 3C, 3D interconnecting these posts, two front channel posts 3E, 3F, a pair of upper channel members 3G, 3H interconnecting the upper ends of the front and rear posts 3E, 3A and 3F, 3B, respectively, a front lateral channel member 3J interconnecting the front ends of the upper members 3G, 3H, a longitudinal member 3K interconnecting the lower ends of the front and rear posts 3E, 3A, an intermediate channel member 3L parallel to the longitudinal member 3K and joined to a widthwise intermediate portion of the rear lateral member 3D, a front lower member 3M connected between the front ends of the intermediate member 3L and the longitudinal member 3K, etc., whereby a box structure 13 is formed. A pair of support channel members 3N, 3P extend rearward from the rear lateral member 3D of the box structure 13 to provide a rear wheel suspension assembly 71. A member 3R, gate-shaped when seen from above, extends forwardly upward from the lower ends of the pair of front posts 3E, 3F to provide a step support.

The engine 4 is provided within the box structure 13 of the frame 3 and mounted on the longitudinal member 3K and the intermediate member 3L by a rubber mount. The engine 4 is positioned approximately in the widthwise midportion of the vehicle body 6. More accurately, the crankshaft 15 of the engine is positioned a short distance leftward from the center line 16 (shown in FIG. 1) of the vehicle body 6. The crankshaft 15 carries large and small two pulleys 17, 18 for delivering power to a running system and a Power-take-off (PTO) system. A radiator 19 and an oil cooler 20 are mounted also on the longitudinal member 3K and the intermediate member 3L.

The speed change unit 5 comprises a hydrostatic transmission (HST) 21 and a gear transmission 22 and is disposed at the right side of the engine 4 in parallel thereto and attached to the upper member 3H and the intermediate member 3L by rubber mounts. The speed change unit 5 may be disposed at the left side of the engine 4. However, to maintain the vehicle body 6 in good balance under gravity, it is desirable to offset the engine 4 toward one side opposite to the unit 5. Since the engine 4 and the speed change unit 5 are arranged adjacent to each other widthwise of the vehicle body, the space occupied thereby has a large width but a short length.

The HST 21, which may be of the radial type or axial type, is of the radial type according to the present embodiment and comprises a pump and a motor assembled together. The shaft 23 of the pump carries a pulley 24 coupled to the large pulley 17 of the engine 4 by a belt, and a cooling fan 25. The motor has a shaft 26 projecting into a casing 27 for the gear transmission 22.

Figure 6:
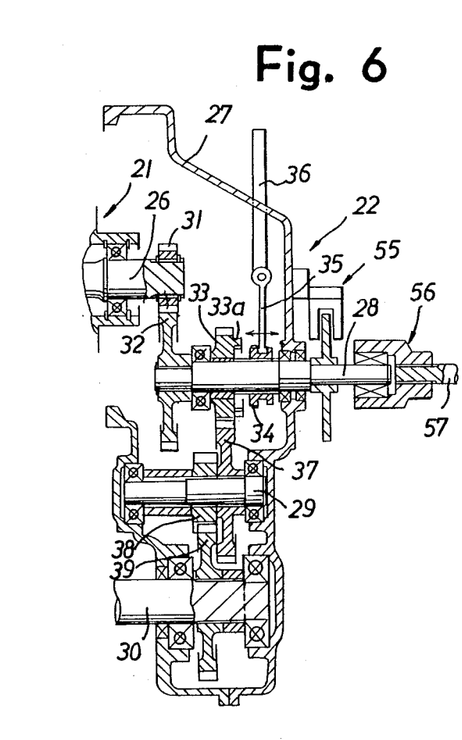
FIG. 6 is a side elevation in section of a gear transmission mechanism.

With reference to FIG. 6, the gear transmission comprises three rotatable shafts, i.e. first to third shafts 28, 29, 30, arranged one above another within the casing 27. The first shaft 28 is projected rearward for driving the rear wheels, and the third shaft 30 forward for driving the front wheels.

A gear 32 meshing with a pinion 31 on the motor shaft 26 is secured to the first shaft 28, which further has a gear 33 freely rotatably mounted thereon and having a shift gear portion 33a, and a shifter 34 splined thereto and engageable with the shift gear portion 33a. The shifter 34 is in engagement with a shifting fork 35 and is slidingly movable by a front drive change lever 36.

Fixedly mounted on the second shaft 29 are a gear 37 meshing with the gear 33 on the first shaft 28, and a gear 38 meshing with a gear 39 secured to the third shaft 30.

The third shaft 30 extends forward and is connected to a bevel pinion shaft 42 of a front wheel differential gear 41 directly or via a universal joint shaft 40.

The differential gear 41 has a differential case 43 bolted to the intermediate member 3L and to a bracket 44 fastened to the lower end of the front post 3F. The case 43 is connected to the casing 27 by a connecting member 45. Accordingly, the HST 21, the gear transmission 22 and the front wheel differential gear 41 can be assembled together first and then attached to the frame 3. When the third shaft 30 is connected directly to the bevel pinion shaft 42, a tubular member encasing these shafts is serviceable as the connecting member 45. Indicated at 47 is a bearing member fixed to the connecting member 45 for the pump shaft 23.

Each of the pair of front axles 7 is provided with the front wheel 8 at its outer end and is supported by the differential case 43 at its inner end. The power is delivered to the axle from the bevel pinion shaft 42 via a bevel gear 46 and differential means.

The bevel pinion shaft 42 of the front wheel differential gear 41 on the front axles 7 is generally aligned with the third shaft 30 and positioned at the right side of the vehicle body 6 off its center line 16, leaving a large space in front of the engine 4. A front axle bearing member 48 is attached to the longitudinal member 3K for supporting the left front wheel 8 which is at a larger distance from the differential gear 41. Indicated at 49 is a battery mounted on the upper member 3G.

A PTO shaft 51 is rotatably supported by the differential case 43 and extends therethrough longitudinally of the vehicle body. The PTO shaft 51 carries a pulley 52 at its rear end for receiving power from the small pulley 18 of the engine 4 via a belt. The shaft 51 is connected at its front end to a universal joint shaft 53 for power transmission to the front mower 2. Indicated at 54 is a tension clutch for the PTO system.

The first shaft 28 is provided at its rear portion with an electromagnetic or mechanical brake 55 for braking the front and rear wheels 8, 10 at the same time. The first shaft 28 is connected at its rear end to a transmission shaft 57 by a one-way clutch 56. The shaft 57 is coupled to an input shaft 59 of a rear wheel gear mechanism 58 by a universal joint 60. The one-way clutch 56 permits high-speed rotation of the rear wheels 10 when the collector 1 is turned by four-wheel with the rear wheels 10 given a larger turning radius than the front wheels 8.

With reference to FIGS. 1, 2, 5 and 7, the rear wheel gear mechanism 58 has a casing 61 which comprises a multiplicity of divided segments arranged one above another. A first case 61A is provided between and fixed to the opposed support members 3N, 3P of the frame 3 for supporting the input shaft 59. A second case 61B is fastened to the first case 61A with bolts for supporting a bevel gear 62, which is in mesh with a bevel pinion 63 on the input shaft 59 and is splined to a vertical bevel pinion shaft 64 at its upper end.

Figure 7:
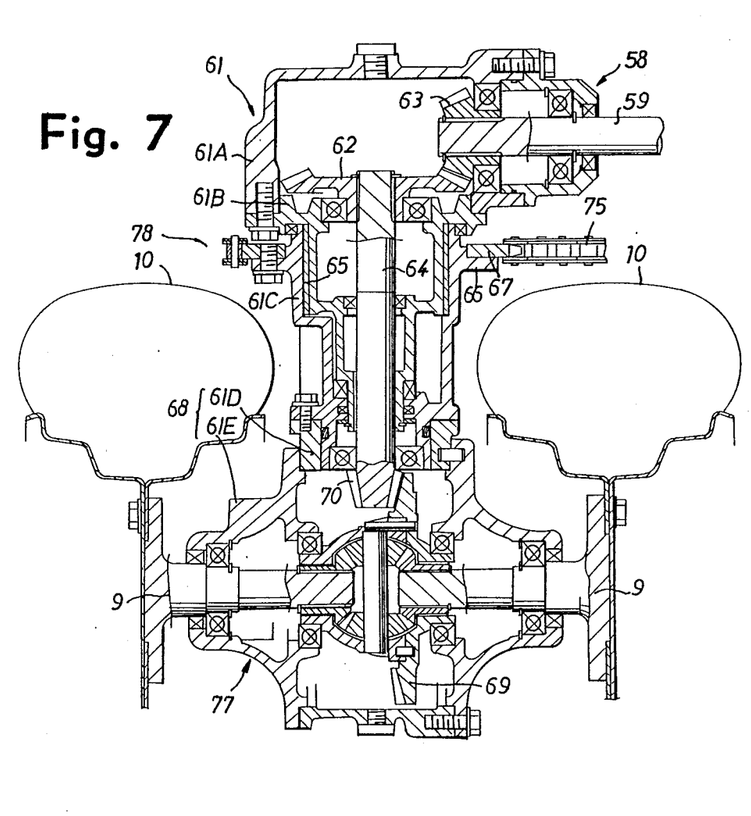
FIG. 7 is a view in vertical section of a rear wheel drive assembly.

The second case 61B is tubular and has a tubular third case 61C fitting therearound. The third case 61C supports the lower portion of the bevel pinion shaft 64 and is prevented from slipping off downward by the shaft 64. The third case 61C is rotatably fitted around the second case 61B with a bush 65 interposed therebetween and has on its outer periphery a flange 66, to which a steering sprocket 67 is bolted.

Fastened to the lower portion of the third case 61C is a fourth case 61D, to which a pair of opposed fifth cases 61E are secured. These fourth and fifth cases 61D, 61E provide a differential case 68 for a rear wheel differential gear 77. A differential bevel gear 69 and the pair of rear axles 9 are supported by the fifth cases 61E. The differential bevel gear 69 is in mesh with a differential bevel gear 70 at the lower end of the shaft 64.

The rear axles 9 have a short length and carry the respective rear wheels 10. The tread of each rear wheel is about one-third of that of the front wheel 8. Under the rear wheel suspension assembly 71 provided by the support members 3N, 3P, the rear axles 9 are turnable through about 160 degrees about a vertical axis by steering.

The rear wheel gear mechanism 58 and the rear wheel differential gear 77 provide a rear wheel drive assembly 78 for transmitting the engine power to the rear wheels 10 via the rear axles 9. When only one rear wheel 10 is used, the differential gear 77 is omitted from the assembly 78.

A steering hydraulic cylinder 73 fixed to the support members 3N, 3P has a piston rod 74 projecting from opposite sides of the cylinder 73 and connected at its opposite ends to the respective ends of a chain 75, which is reeved around the sprocket 67. The portion of the gear mechanism 58 not higher than the third case 61C is rotatable through about 160 degrees relative to the first and second cases 61A, 61B by the reciprocating movement of the piston rod 74. Two guide sprockets 76 are supported by the support members 3N, 3P to hold the chain 75 reeved around the sprocket 67. The hydraulic cylinder 73, the chain 75, the sprockets 67, 76, etc. provide steering means 85 for rotating the rear axles 9 about a vertical axis to steer the rear wheels 10.

The steering assembly 13 includes a steering wheel 79 which is positioned at the foremost portion of the vehicle body 6. A step plate 80 is attached to the gate-shaped support member 3R and is provided at the middle of its front portion with an upright post 81 for the steering wheel. A valve 82 for controlling the hydraulic cylinder 73 is attached to the rear side of the step plate 80.

The two rear wheels 10 serving as steering wheels may be replaced by only one idly rotatable steering wheel. FIG. 8 shows such an embodiment. A leg member 128 is supported by a thrust bearing 127 on a support 126 which is secured to the opposed support members 3N, 3P. A single rear wheel 10 is supported by a rear axle 9 on the leg member 128. The leg member 128 is fixedly provided with a gear 129 meshing with a pinion 131 fixed to the output shaft of a hydraulic motor 130. The motor 130 is operated by the steering wheel 79. An Ackermann steering gear may be used for the rear wheel.

The pair of support members 3N, 3P provides the rear wheel suspension assembly 71 and also serves as a mount for the clipping container 11. The container 11 is positioned immediately above the rear wheels 10. Although not shown in detail, the container 11 comprises a support frame and a basket attached to the support frame and made of a punched metal sheet, metal netting or the like. The support frame includes front posts 84 the lower ends of which are inserted in tubular members 83 secured to the respective rear posts 3A, 3B, whereby the support frame is removably attached to the frame 3. The support frame or the basket is placed on the support members 3N, 3P directly or with a support base provided therebetween. The basket has a closable opening in its rear wall or side wall for removing the clippings therefrom. The clipping container 11 has a width larger than the width of the vehicle body 6 but smaller than the distance between the outer sides of the opposed front wheels 8.

Figure 1:
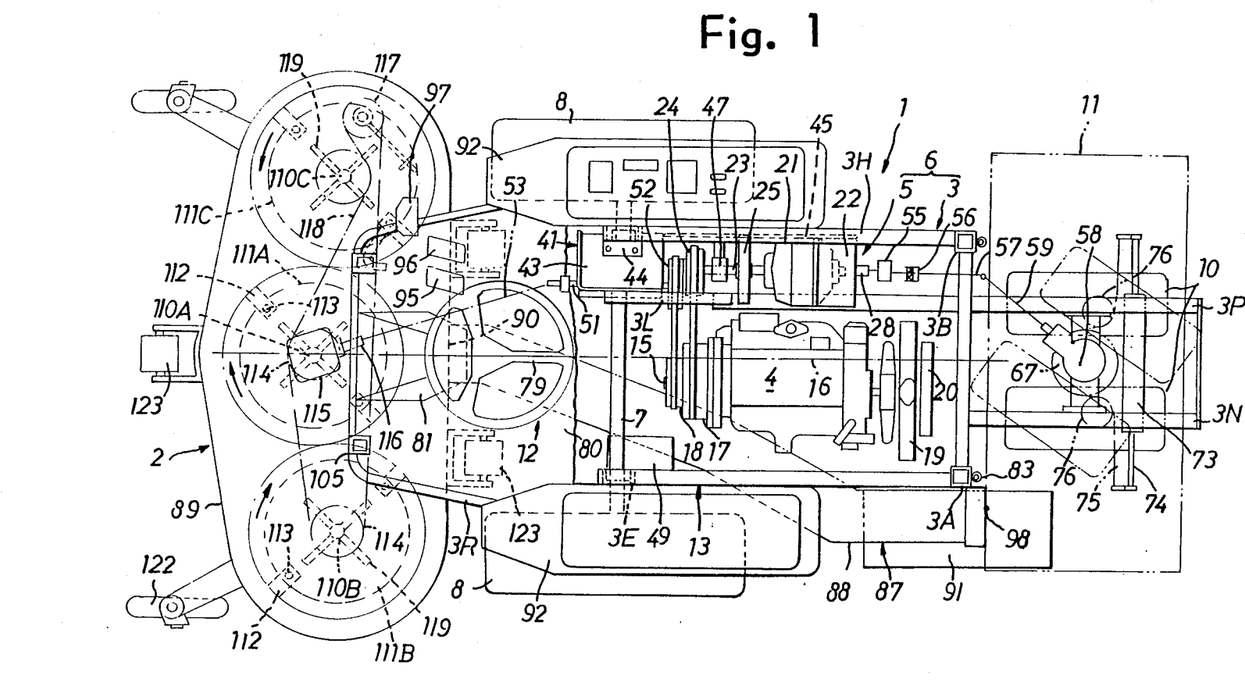
FIG. 1 is an overall plan view of the embodiment.
Figure 2:
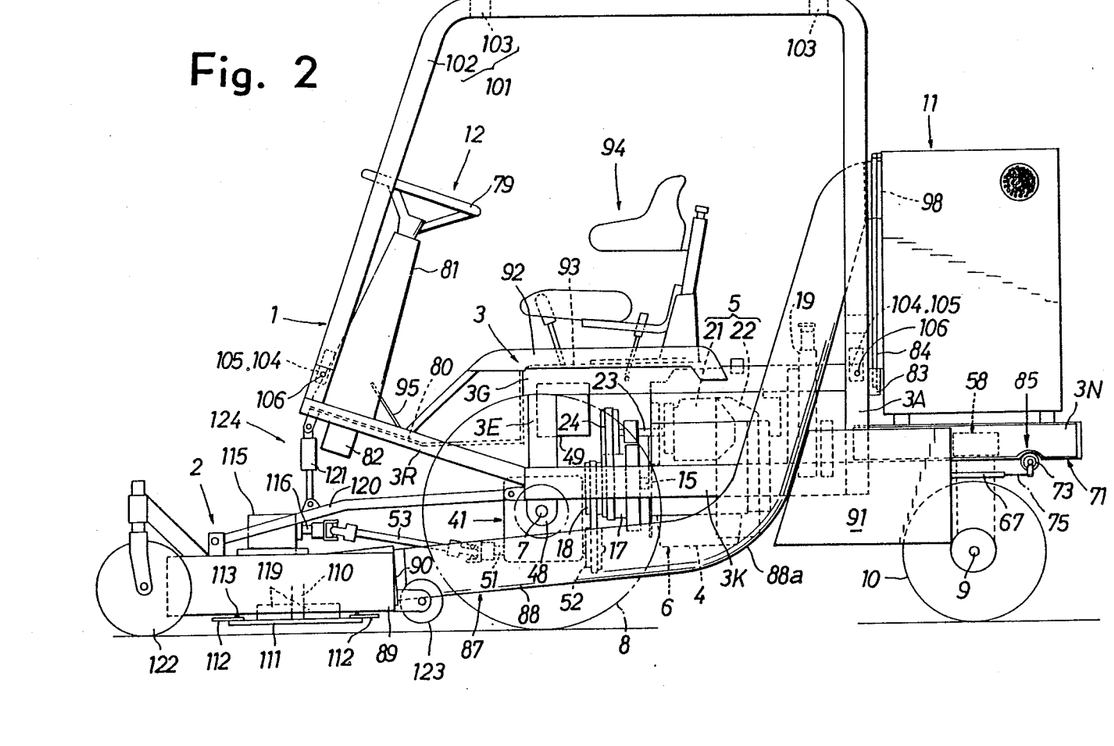
FIG. 2 is an overall side elevation.
Figure 3:
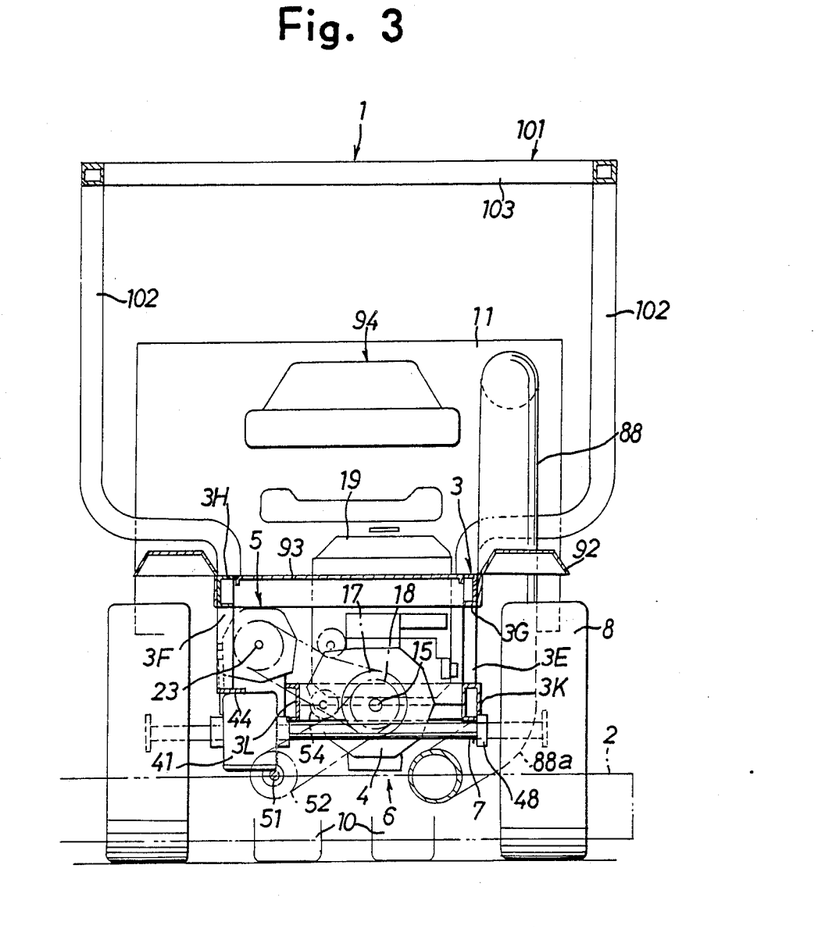
FIG. 3 is a front view in section.

The container 11 is connected to the mower 2 by clipping transfer means 87. With reference to FIGS. 1 to 3, the transfer means 87 comprises a duct 88 connected at its front end to a clipping outlet 90 formed approximately at the center of the rear wall of a mower deck 89. The rear end of the duct is attached to an inlet 98 in the front upper portion of the container 11. From the clipping outlet 90 which is positioned as aligned with the central line 16 of the vehicle body 6, the duct 88 extends between the front wheels 8 under the front axle 7 to the left side of the body 6 behind the left front wheel 8 and is then bent upward in an L-form as indicated at 88a. When seen from one side, the duct 88 extends generally horizontally to the intermediate bent portion 88a although slightly inclined upward toward the rear. When seen from above, the duct is inclined from the center of the vehicle body 6 leftward toward the rear to extend at the left side of the engine 4. Since the front wheel differential gear 41 is positioned on one side of the center line 16, the duct 88 can be positioned close to the left front axle 7 without interference of the differential case 43 and is held at a sufficient level above the ground.

The clipping outlet 90, although directed slightly upward, is substantially at the same level as the clipping transport space inside the mower deck 89.

The duct 88, although projecting outward beyond the frame 3, is positioned inwardly of the front wheels and opposite side walls of the container 11. Provided behind the intermediate bent portion 88a of the duct 88 is a storage container 91 serving as a fuel tank and fastened to the outer side of the frame 3. The container 91 is positioned under the clipping container 11 outside the corresponding rear wheel 10, but may be positioned at the front side of the container 11.

The container 91 precludes the bent portion 88a from striking against obstacles when the collector is advanced rearward. The duct 88 is almost completely protected from obstacles in front and rear thereof by the front wheel 8, the container 11 and the container 91. A pair of containers 91 may be provided at the respective sides of the frame 3, while the container 91 may alternatively be usable, for example, as an auxiliary fuel tank or tool box.

Front wheel fenders 92 are secured to the outer surfaces of the opposed upper members 3G, 3H of the frame 3, and a floor sheet 93 is fixedly provided between the fenders. The floor sheet 93 is joined at its front end to the step plate 80, and the operator's seat 94 is mounted on the sheet. The seat 94 is positioned between the front wheels 8 above the box structure 13. Pedals 95 and 96 are respectively forward and reverse speed change pedals for the HST. Indicated at 97 is a brake pedal.

With reference to FIGS. 2 and 3, a safety frame 101 for protecting the operator in the seat 94 comprises opposed side frame members 102 gate-shaped when seen from one side and interconnected by top lateral members 103. Each of the members 102, 103 is made of a pipe having a square or circular cross section.

The lower ends of the front and rear legs of the frame members 102 each have a spigot 104 formed by fixedly inserting a rod of square cross section into the lower end as seen in FIGS. 2 and 4. The spigot 104 of each rear leg is inserted in a socket portion 105 at the upper end of each rear post 3A (3B) made of square pipe and is held thereto by a pin or bolt 106. The spigot 104 of each front leg is inserted in a socket 105 formed by attaching a squre pipe to the front portion of the step support member 3R and is held thereto by a pin or bolt 106. Accordingly, the safety frame 101 is removably attached to the vehicle body 6. The safety frame 101 may be removably provided with an awning at its top.

With reference to FIGS. 1 and 2, the mower 2 has three vertical shafts 110A, 110B, 110C supported on its deck 89. Each vertical shaft 110 has at its lower end a disk 111. Cutters 112 are movably supported on the disk 111 each by a pivot 113. The rotation of the disk 111 centrifugally radially projects the cutters 112 outward for cutting grass.

Each of the three vertical shafts 110 is provided with a sprocket 114 at its upper portion. The upper end of the central shaft 110A is inserted in a gear case 115 fixed to the mower deck 89 for receiving the power delivered from an input shaft 116 which is connected by the universal joint 53 to the PTO shaft 51 supported by the front differential case 43.

A chain 118 is reeved around a tension sprocket 117 and the sprockets 114 on the three vertical shafts 110. The disks 111A, 111B, 111C are driven in the direction of arrows shown in FIG. 1 by the power from the PTO shaft 51. Gear or belt transmission means is suitably usable for power transmission to the three shafts 110.

Each disk 111 is provided on its upper side with a plurality of blades 119 to serve as a blower for transporting clippings into the duct 88. Thus, the blades 119 constitute the clipping transfer means 87. The blades 119 may be replaced by a blower provided at an intermediate portion of the duct 88 or inside the mower deck 89 or the container 11 and rotatable independently or by the power from the engine 4.

The mower 2 is connected to the vehicle body 6 by two links 120 pivoted to the front lower member 3M. Lift means 121 is connected between the step plate 80 or the step support member 3R and the two links 120. The lift means 121, which comprises a hydraulic cylinder, holds the mower 2 raised when the collector 1 travels on the road but is extendable during mowing operation. The links 120, the lift means 121, etc. constitute a mount assembly 124 for attaching the mower 2 to the vehicle body 6.

The mower 2 is provided with a pair of ground engaging wheels 122 at the respective sides thereof, and limit gauge wheels 123 in front of the midportion thereof and opposite side rear portions thereof.

The present invention is not limited to the foregoing embodiments but can be modified variously. For example, the front wheels 8 can be steering wheels, or the speed change unit 5 may be of the mechanical type. The front wheel differential gear 41 can be positioned on the center line 16 of the vehicle body. The clipping outlet 90 is formed in the widthwise midportion of the rear wall of the mower deck 89 when the mower 2 comprises two cutters, or is positioned toward one side from the midportion when the mower has one or three cutters, so as to eject clippings most smoothly.

What is claimed is:

1. A clipping collector equipped with a front mower and comprising a frame having an engine and a speed change unit mounted thereon to provide a vehicle body, a pair of opposed front wheels supported by a front axle at the front portion of the vehicle body, the mower being positioned to the front of the front wheels and attached to the vehicle body by a mount assembly, at least one rear wheel supported by a rear axle at the rear portion of the vehicle body, a clipping container disposed above the rear wheel, the mower having at least one cutter operable by the power transmitted from the engine, the mower having a clipping outlet at a widthwise intermediate portion of its rear side, and clipping transfer means having a duct extending from the clipping outlet to the clipping container, the duct extending from the clipping outlet generally horizontally rearward under the front axle, and being bent upward at a lengthwise intermediate portion thereof and connected to the clipping container, and the engine and the speed change unit are arranged adjacent to each other widthwise of the frame between the front and rear axles.

2. A clipping collector as defined in claim 1 wherein the duct of the transfer means has its bent portion positioned to the rear of one of the front wheels, is inclined sidewise as the duct extends rearward from the clipping outlet to the bent portion, and further extends from the bent portion upward within the width of the clipping container in front thereof.

3. A clipping collector as defined in claim 1 wherein a storage container for protecting the duct is provided at the rear side of the upwardly bent portion of the duct and attached to the vehicle body under one side of the clipping container.

4. A clipping collector as defined in claim 3 wherein the storage container is a fuel tank.

5. A clipping collector as defined in claim 1 wherein the front wheel axle is provided with a front wheel differential gear for transmitting to the front axle the power delivered from the engine via the speed change unit, and the differential gear is sidewise spaced from the duct extending from the clipping outlet of the mower rearward under the front axle.

6. A clipping collector as defined in claim 1 wherein the differential gear has a differential case rotatably provided with a PTO shaft for transmitting the power of the engine to the mower.

7. A clipping collector as defined in claim 1 wherein the front axle is provided with a front wheel differential gear disposed in front of the speed change unit and connected to the speed change unit by a connecting member.

8. A clipping collector as defined in claim 1 wherein the frame includes a box structure at a lengthwise intermediate portion thereof, a rear wheel suspension assembly extending rearward from a vertically intermediate rear portion of the box structure, the engine and the speed change unit being mounted in the box structure, the front axle being supported by the front lower portion of the box structure, the rear axle being supported by the suspension assembly and supporting the rear wheel as a steering wheel, the clipping container being mounted on the upper portion of the suspension assembly.

9. A clipping collector equipped with a front mower and comprising a frame having an engine and a speed change unit mounted thereon to provide a vehicle body, a pair of opposed front wheels supported by a front axle at the front portion of the vehicle body, the mower being positioned to the front of the front wheels and attached to the vehicle body by a mount assembly, at least one rear wheel supported by a rear axle at the rear portion of the vehicle body, a clipping container disposed above the rear wheel, the mower having at least one cutter operable by the power transmitted from the engine, the mower having a clipping outlet at a widthwise intermediate portion of its rear side, and clipping transfer means having a duct extending from the clipping outlet to the clipping container, the duct extending from the clipping outlet generally horizontally rearward under the front axle, and being bent upward at a lengthwise intermediate portion thereof and connected to the clipping container, and the rear axle being supported by the rear portion of the frame, and the frame rear portion being provided with a rear wheel drive assembly for transmitting the power of the engine to the rear wheel through the rear axle and steering means for steering the rear wheel around a vertical axis, the rear wheel being positioned under the rear portion of the frame.

10. A clipping collector as defined in claim 9 wherein the rear wheel drive assembly comprises a tubular inner case fixed to the frame and a tubular outer case fitting around the tubular inner case and thereby supported rotatably about said vertical axis for supporting the rear axle rotatably about a horizontal axis, and the steering means comprises a sprocket secured to the tubular outer case and an accumulator fixed to the frame for rotating the sprocket through a chain.

11. A clipping collector equipped with a front mower and comprising a frame having an engine and a speed change unit mounted thereon to provide a vehicle body, a pair of opposed front wheels supported by a front axle at the front portion of the vehicle body, the mower being positioned to the front of the front wheels and attached to the vehicle body by a mount assembly, at least one rear wheel supported by a rear axle at the rear portion of the vehicle body, a clipping container disposed above the rear wheel, the mower having at least one cutter operable by the power transmitted from the engine, the mower having a clipping outlet at a widthwise intermediate portion of its rear side, and clipping transfer means having a duct extending from the clipping outlet to the clipping container, the duct extending from the clipping outlet generally horizontally rearward under the front axle, and being bent upward at a lengthwise intermediate portion thereof and connected to the clipping container, and the engine and the speed change unit mounted on the frame being arranged adjacent to each other widthwise of the frame, the front axle being provided with a front wheel differential gear in front of the speed change unit, the rear axle being provided with two rear wheels and a rear wheel differential gear, the frame being provided at is rear portion with a rear wheel gear mechanism for transmitting the power of the engine to the rear wheel differential gear, the gear mechanism supporting the rear wheel differential gear rotatably about a vertical axis, the frame rear portion being provided with means for steering the rear wheels by rotating the rear wheel differential gear about the vertical axis, the mower being provided with three cutters arranged widthwise of the frame, the duct extending from the clipping outlet in the rear side of the mower to behind one of the front wheels through a position away from the front differential gear and under the front axle and through a position away from the speed change unit at one said of and below engine.

* * * * *